US010708139B2

(12) United States Patent
Rosh et al.

(10) Patent No.: US 10,708,139 B2
(45) Date of Patent: Jul. 7, 2020

(54) AUTOMATIC GROUPING OF SIMILAR APPLICATIONS AND DEVICES ON A NETWORK MAP

(71) Applicant: ServiceNow, Inc., Santa Clara, CA (US)

(72) Inventors: Haviv Rosh, Modiin (IL); Alexei Tilikin, Petah (IL)

(73) Assignee: ServiceNow, Inc., Santa Clara, CA (US)

( * ) Notice: Subject to any disclaimer, the term of this patent is extended or adjusted under 35 U.S.C. 154(b) by 169 days.

(21) Appl. No.: 15/666,164

(22) Filed: Aug. 1, 2017

(65) Prior Publication Data
US 2019/0044815 A1    Feb. 7, 2019

(51) Int. Cl.
*H04L 12/24*     (2006.01)
*G06F 16/955*    (2019.01)
(Continued)

(52) U.S. Cl.
CPC ............ *H04L 41/12* (2013.01); *G06F 16/955* (2019.01); *H04L 41/0853* (2013.01);
(Continued)

(58) Field of Classification Search
CPC ..... H04L 41/12; H04L 41/0853; H04L 67/20; H04L 41/0893; H04L 41/22;
(Continued)

(56) References Cited

U.S. PATENT DOCUMENTS 6,477,572 B1    11/2002  Elderton et al.
8,463,905 B2     6/2013  Dee
(Continued)

FOREIGN PATENT DOCUMENTS

WO     2015070189 A1    5/2015

OTHER PUBLICATIONS

Extended European Search Report and Written Opinion for European Application No. 18165087.0 dated Aug. 10, 2018; 9 pgs.
(Continued)

*Primary Examiner* — Jason D Recek
(74) *Attorney, Agent, or Firm* — Fletcher Yoder P.C.

(57) ABSTRACT

An embodiment may involve a managed network containing computing devices. The computing devices may be respectively associated with unqualified domain names. One or more server devices may be disposed within a remote network management platform that manages the managed network. These server devices may be configured to: probe the managed network, by way of a proxy server application disposed within the managed network, to obtain information related to applications operating on the computing devices, network connectivity of the computing devices, and representations of the unqualified domain names; obtain a regular expression; determine a subset of the computing devices in the managed network on which a particular application is operating and for which the respectively associated unqualified domain names match the regular expression; and generate a map of the managed network in which the subset of the computing devices is represented as a grouped node instead of individual nodes.

18 Claims, 11 Drawing Sheets

(51) Int. Cl.
    *G06F 16/903* (2019.01)
    *G06F 3/0484* (2013.01)
    *H04L 29/08* (2006.01)
(52) U.S. Cl.
    CPC .......... *H04L 41/0893* (2013.01); *H04L 41/14* (2013.01); *H04L 41/22* (2013.01); *G06F 3/04842* (2013.01); *G06F 16/90344* (2019.01); *H04L 67/20* (2013.01)
(58) Field of Classification Search
    CPC ............... G06F 16/955; G06F 3/04842; G06F 16/90344; G06F 17/30876; G06F 17/30985
    See application file for complete search history.

(56) References Cited

U.S. PATENT DOCUMENTS

| | | |
|---|---|---|
| 8,856,341 B2 | 10/2014 | Heumesser et al. |
| 2002/0138649 A1* | 9/2002 | Cartmell ................. H04L 29/06 709/245 |
| 2006/0069805 A1 | 3/2006 | LeBlanc |
| 2008/0098332 A1 | 4/2008 | LaFrance-Linden et al. |
| 2011/0277034 A1 | 11/2011 | Hanson |
| 2013/0290237 A1 | 10/2013 | Griffith et al. |
| 2014/0007241 A1 | 1/2014 | Gula et al. |
| 2015/0288569 A1* | 10/2015 | Agarwal ................. H04L 41/12 709/224 |
| 2016/0112270 A1 | 4/2016 | Danait et al. |
| 2016/0219078 A1 | 7/2016 | Porras et al. |
| 2017/0034001 A1 | 2/2017 | Dagan |

OTHER PUBLICATIONS

ServiceNow Documentation, May 3, 2017, downloaded from http://docs.servicenow.com.
ECMA International, ECMAScript® Language Specfication, Ed. 5.1, Jun. 2011.

* cited by examiner

AUTOMATIC GROUPING OF SIMILAR APPLICATIONS AND DEVICES ON A NETWORK MAP

BACKGROUND

Computer networks may involve dozens or hundreds of computing devices, each operating one or more software applications. These devices and applications may, in combination with one another, support and/or facilitate higher-level or end-to-end services. Network mapping tools can be used to provide visual representations of these devices and applications, as well as the connectivity therebetween. For instance, various devices and/or applications may be represented as nodes in a graph, and the connectivity of these nodes may be represented as edges of the graph.

As the size of networks grow, however, these network mapping tools become less useful, as the sheer number of nodes and connections is too great to be represented on a computer screen. Also, even if all of such a visual representation can fit onto a screen, it may be too complex and intricate to be of practical use.

SUMMARY

The embodiments herein improve upon network mapping technology by intelligently grouping nodes representing devices and/or applications based on regular expressions that match their respective unqualified domain names, or other names or tags associated with these devices and/or applications. In doing so, complex network maps can be represented in a significantly simpler fashion, while still providing a comprehensive view of the network and its devices and applications.

Accordingly, a first example embodiment may involve a managed network containing a plurality of computing devices. The plurality of computing devices may be respectively associated with unqualified domain names. This embodiment may also involve a proxy server application disposed within the managed network, and one or more server devices disposed within a remote network management platform that manages the managed network. The one or more server devices may be configured to: probe the managed network, by way of the proxy server application, to obtain information related to applications operating on the plurality of computing devices, network connectivity of the plurality of computing devices, and representations of the unqualified domain names; obtain a regular expression; determine a subset of the plurality of computing devices in the managed network on which a particular application of the applications is operating and for which the respectively associated unqualified domain names match the regular expression; generate a map of the managed network, where the applications operating on the plurality of computing devices are represented as individual nodes in the map, where edges between the individual nodes are defined based on the network connectivity of the plurality of computing devices, and where the subset of the plurality of computing devices is represented as a grouped node instead of individual nodes; and provide, for display on a client device, a representation of the map.

A second example embodiment may involve probing, by a computing system, a managed network to obtain information related to applications operating on a plurality of computing devices on the managed network, network connectivity of the plurality of computing devices, and representations of unqualified domain names respectively associated with the plurality of computing devices. This embodiment may also involve obtaining, by the computing system, a regular expression. This embodiment may further involve determining, by the computing system, a subset of the plurality of computing devices in the managed network on which a particular application of the applications is operating and for which the respectively associated unqualified domain names match the regular expression. This embodiment may additionally involve generating, by the computing system, a map of the managed network. The applications operating on the plurality of computing devices may be represented as individual nodes in the map, edges between the individual nodes may be defined based on the network connectivity of the plurality of computing devices, and the subset of the plurality of computing devices may be represented as a grouped node instead of individual nodes. This embodiment may also involve providing, by the computing system and for display on a client device, a representation of the map.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
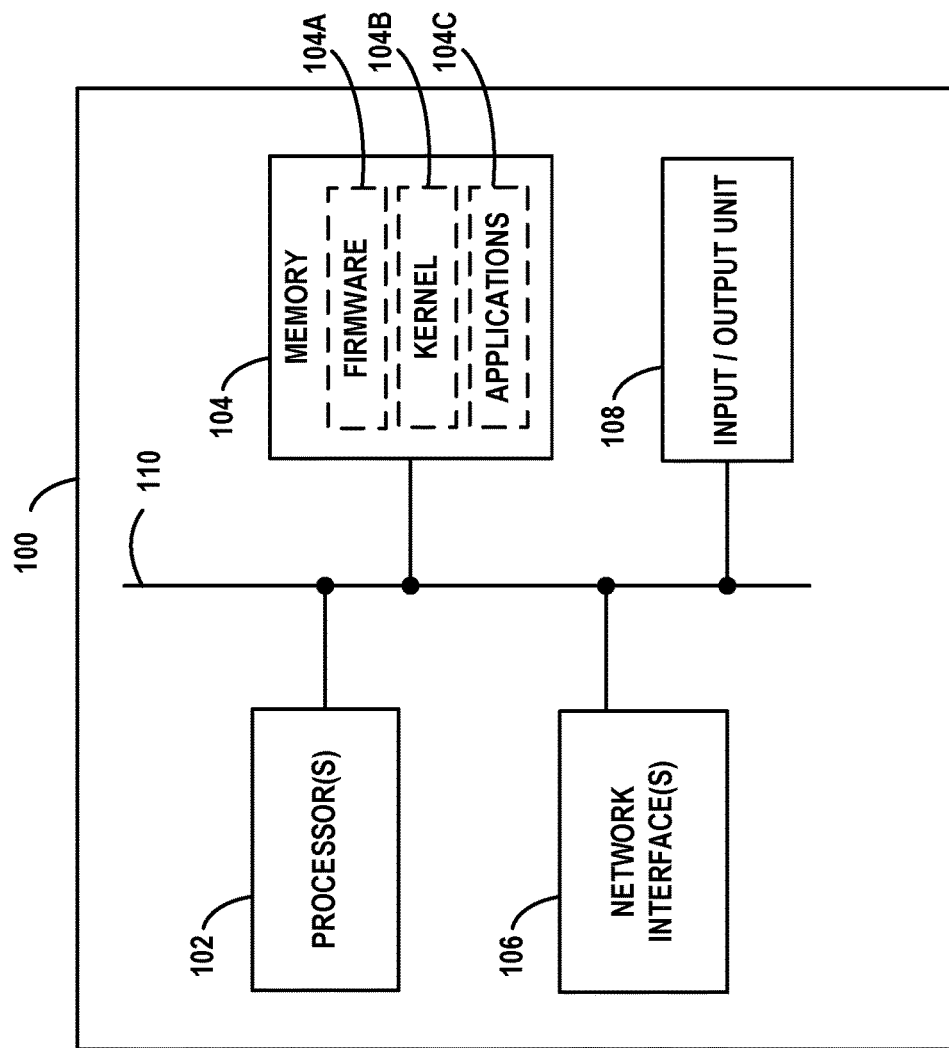
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
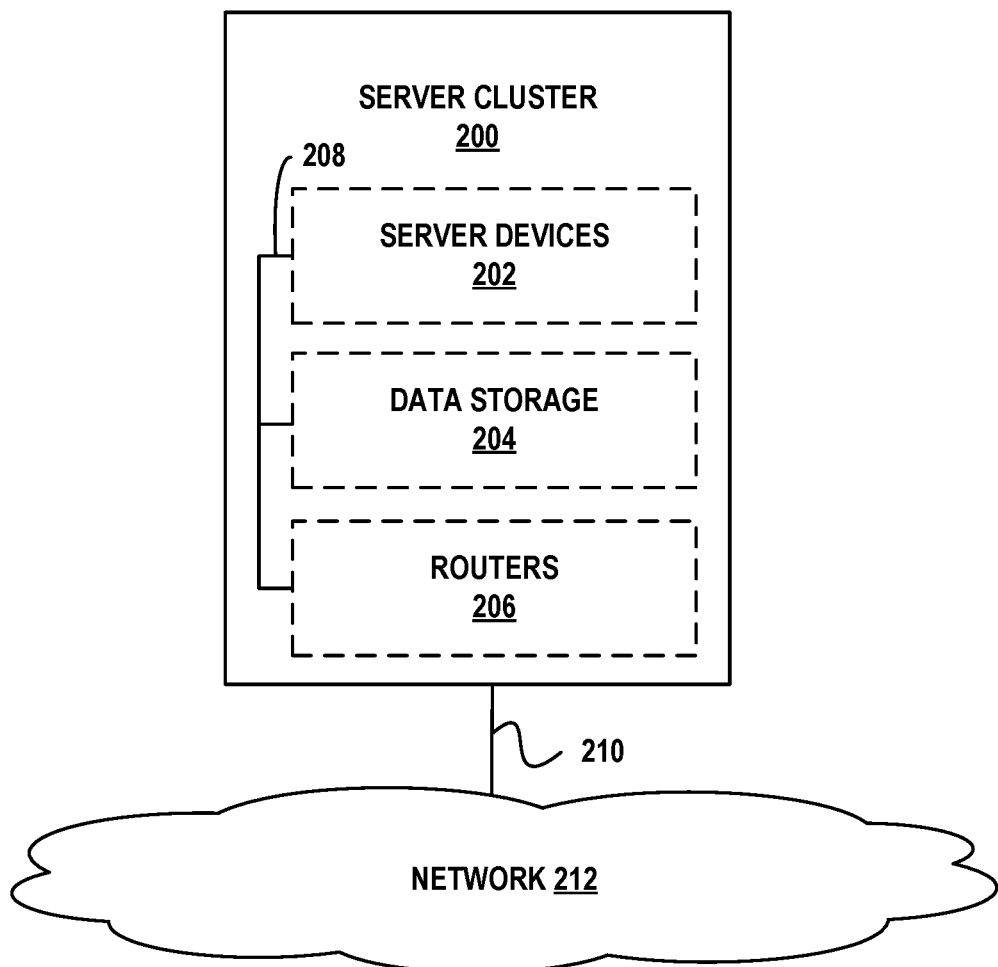
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
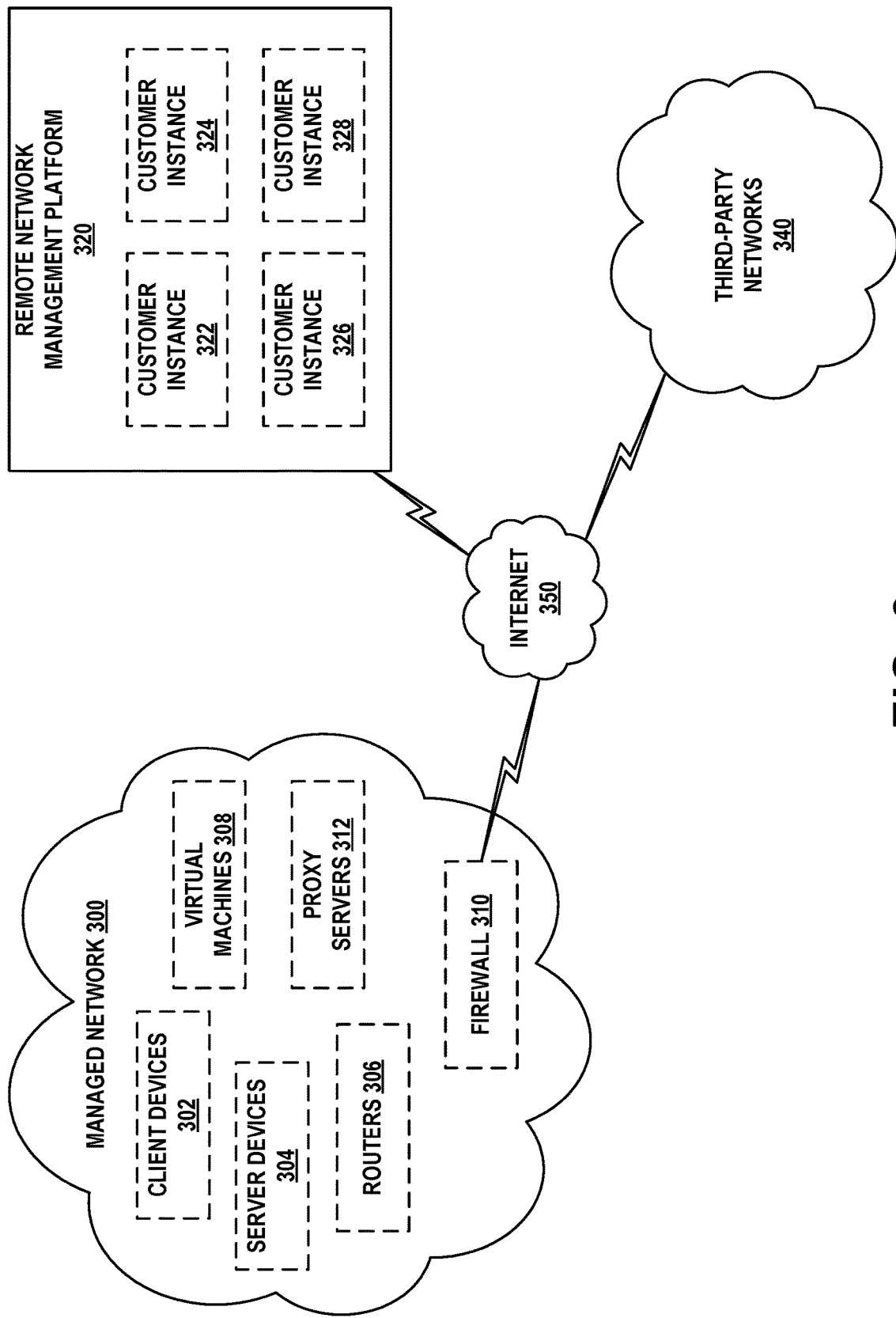
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
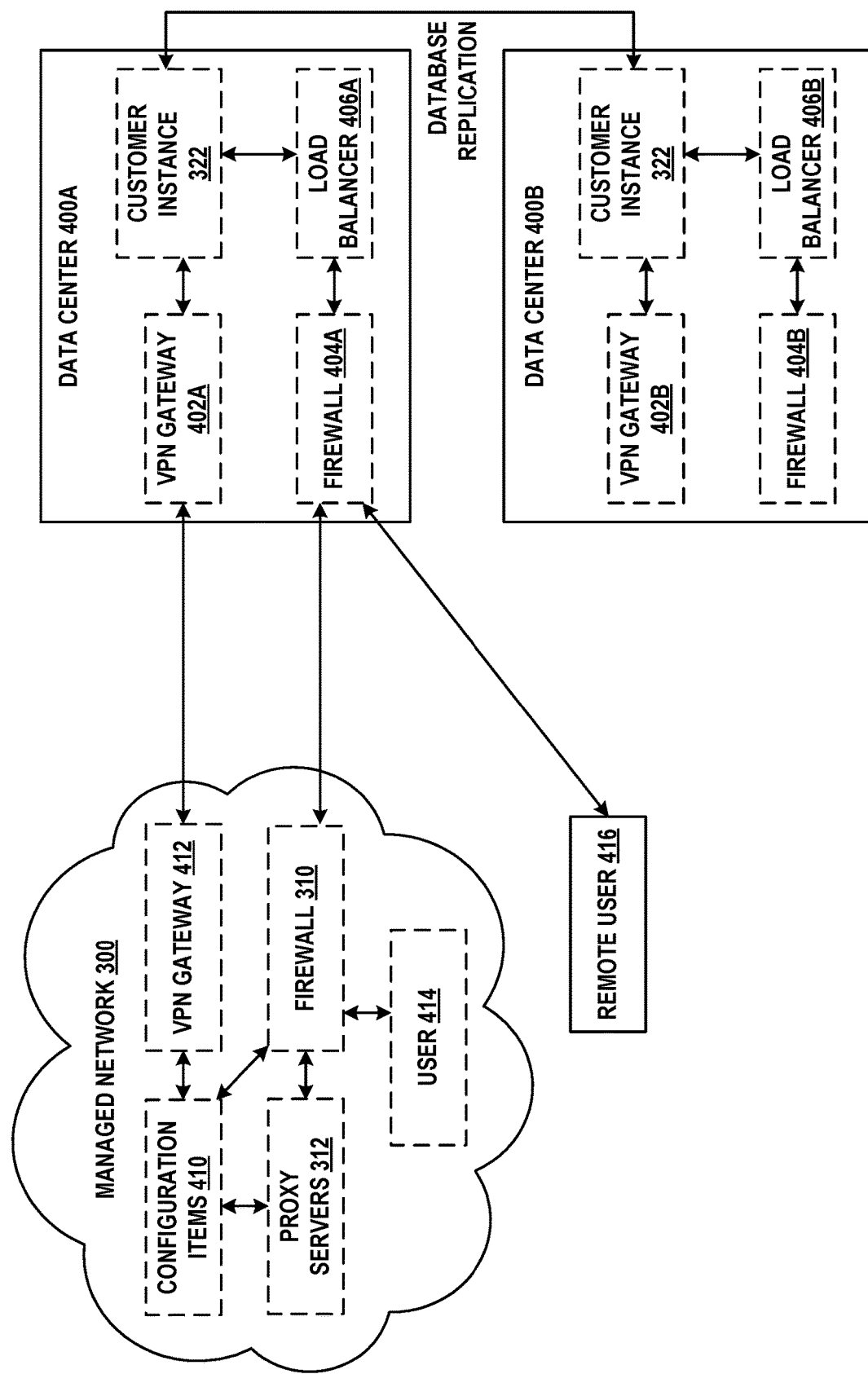
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by customer instance 322, or relationships between discovered devices, applications, and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to a process, thread, program, client, server, or any other software that executes on a device. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
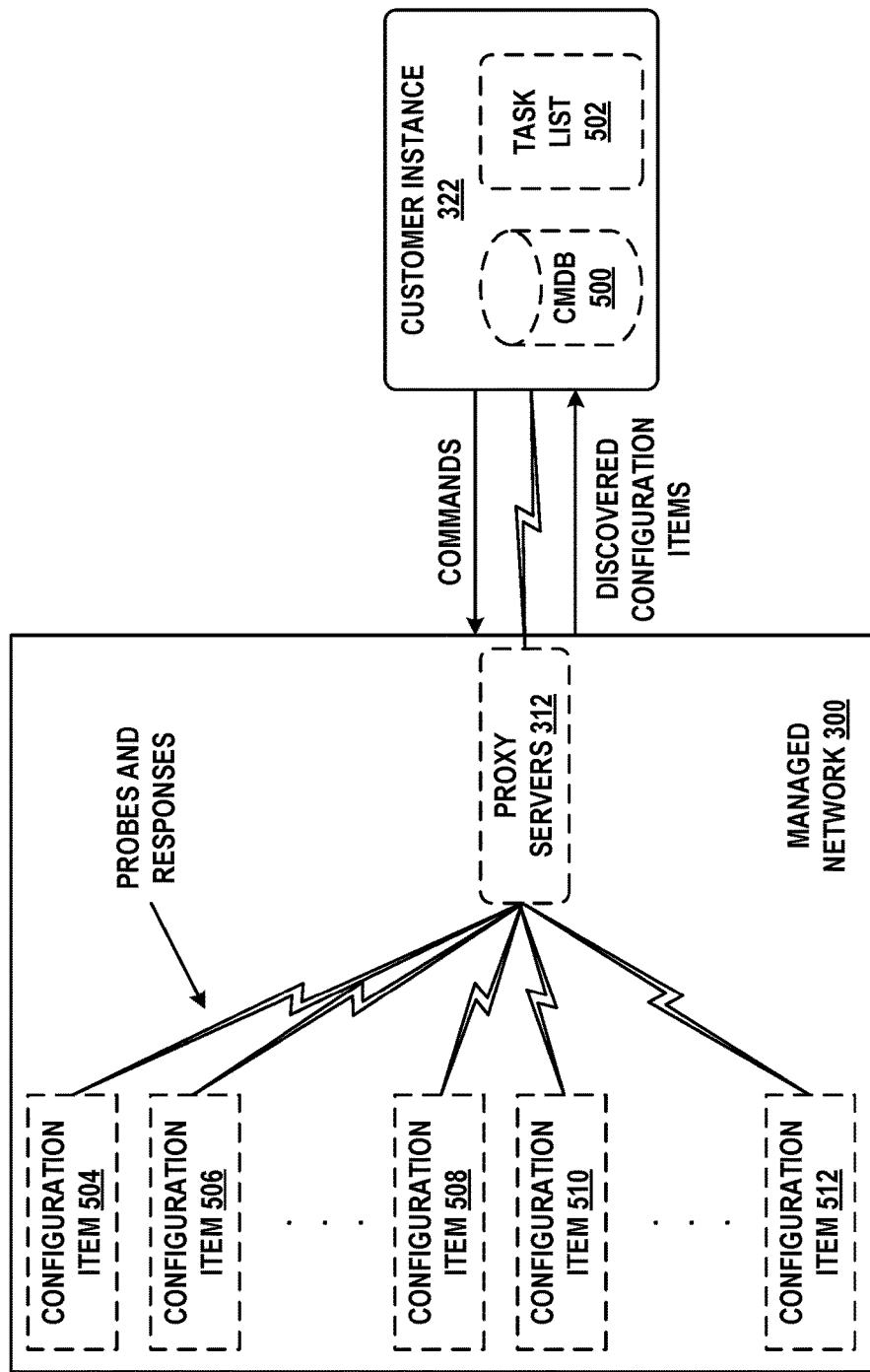
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
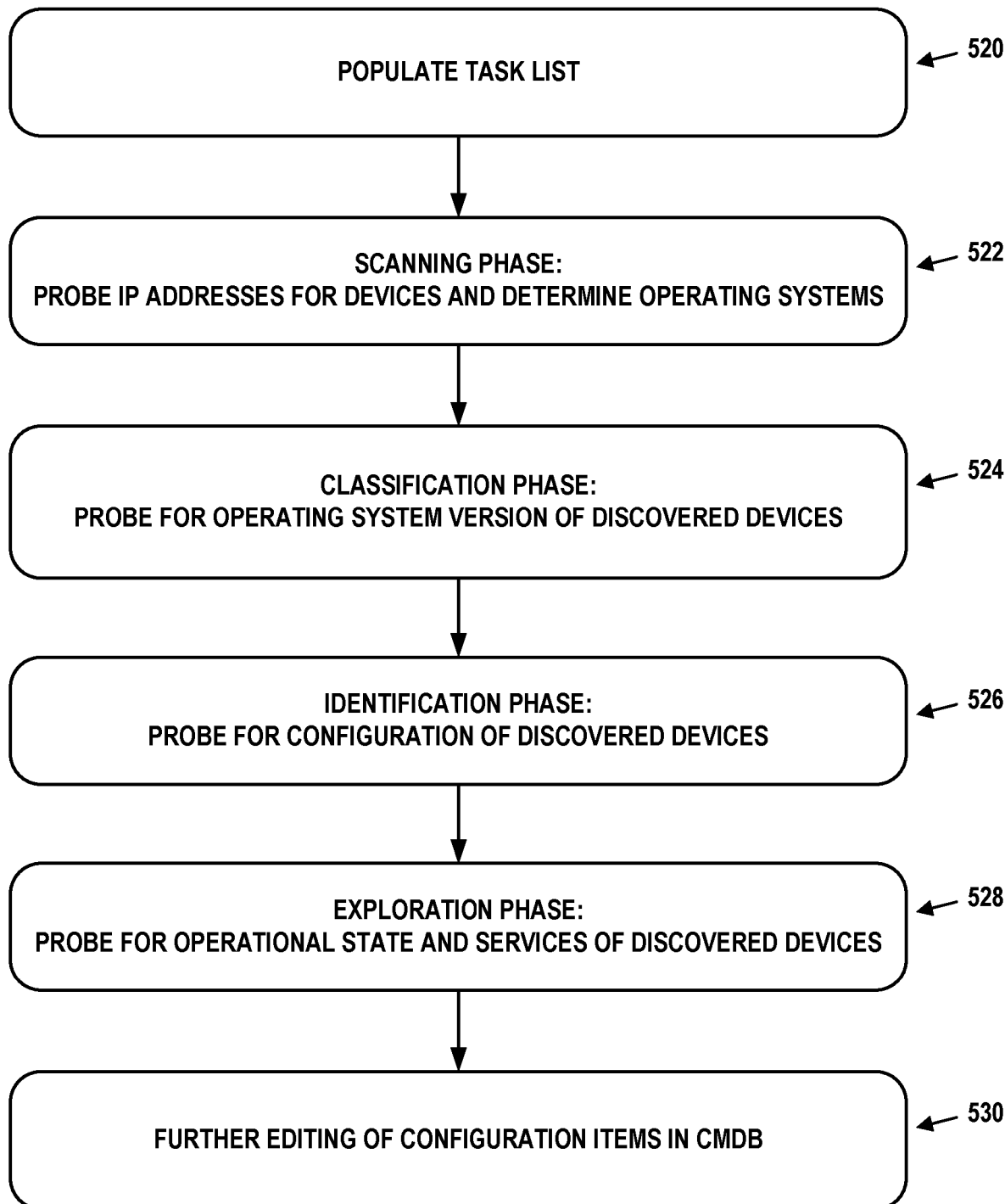
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE NETWORK MAPPING

The discovery procedures described herein are particularly helpful in generating network maps. A network map may be a visual representation on a GUI, for instance, that depicts particular applications operating on particular devices as nodes in a graph. The edges of the graph may represent physical and/or logical network connectivity between these nodes. An instance of a network map may be tailored to represent the devices and applications that make up or contribute to the operation of a service.

Discovery procedures may be used to determine the physical or logical arrangement of devices on a managed network, as well as the applications operating on these devices. Discovery procedures may also determine the relationships between these devices and applications that define services. Alternatively or additionally, services may be manually defined after discovery has at least partially completed. From this information, a network map can be derived.

A. Example Email Service Map

Figure 6A:
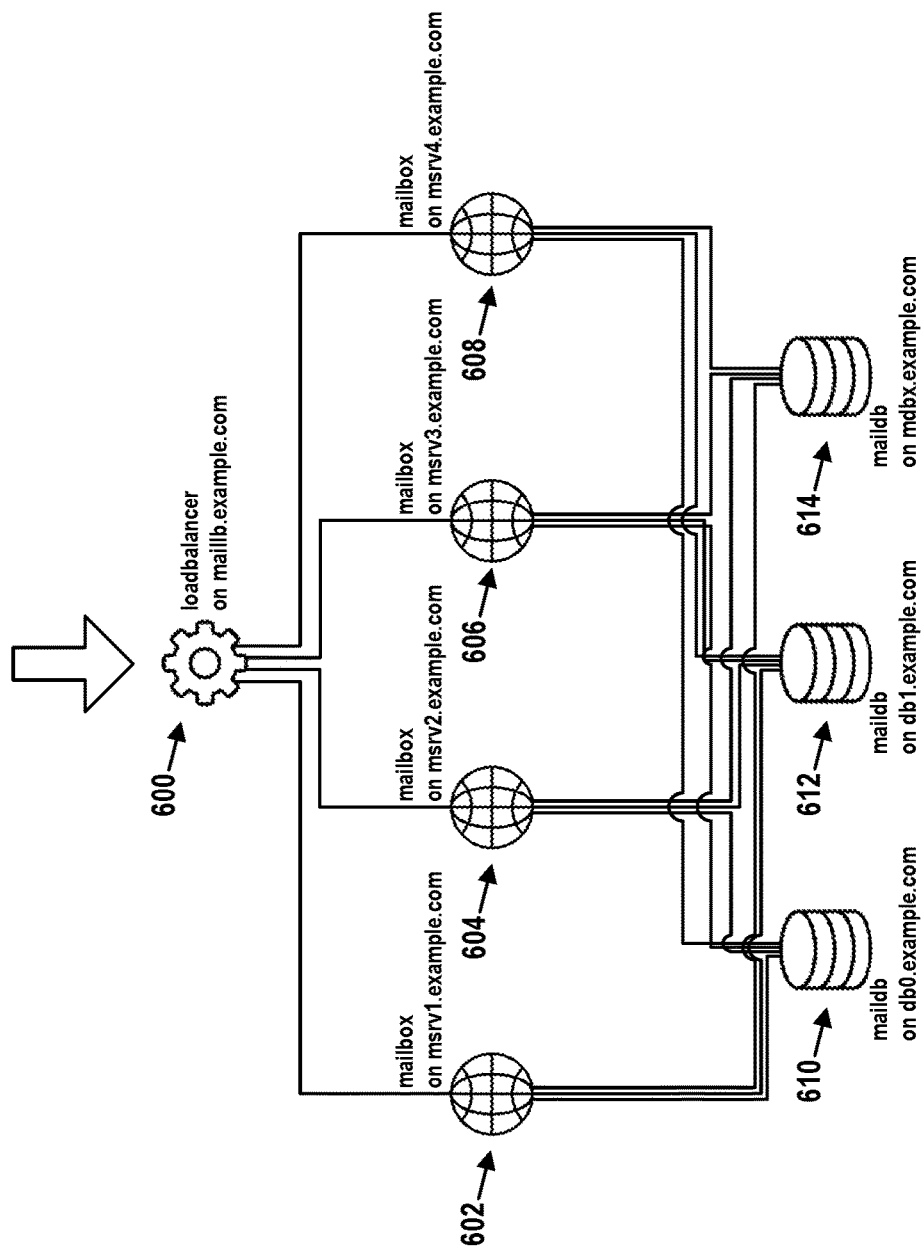
FIG. 6A depicts a network map, in accordance with example embodiments.

FIG. 6A provides an example network map including applications and devices that make up an email service that supports redundancy and high-availability. This map may be generated for display on the screen of a computing device. As noted above, the nodes in the map represent applications operating on devices. These nodes may take the form of icons related to the respective functions of the applications or devices.

The entry point to the email service, as designated by the large downward-pointing arrow, may be load balancer 600 ("loadbalancer"). Load balancer 600 may be represented with a gear icon, and may operate on a device with host name maillb.example.com. This host name, as well as other host names herein, may be a partially-qualified or fully-qualified domain name in accordance with DNS domain syntax.

Load balancer 600 may distribute incoming requests across mailbox applications 602, 604, 606, and 608 ("mailbox") operating on mail server devices msrv1.example.com, msrv2.example.com, msrv3.example.com, and msrv4.example.com, respectively. These mail server devices may be represented by globe icons on the map. Connectivity between load balancer 600 and each of mailbox applications 602, 604, 606, and 608 is represented by respective edges.

Mailbox applications 602, 604, 606, and 608 may, for instance, respond to incoming requests for the contents of a user's mail folder, for the content of an individual email message, to move an email message from one folder to another, or to delete an email message. Mailbox applications 602, 604, 606, and 608 may also receive and process incoming emails for storage by the email service. Other email operations may be supported by mailbox applications 602, 604, 606, and 608. For sake of example, it may be assumed that mailbox applications 602, 604, 606, and 608 perform essentially identical operations, and any one of these applications may be used to respond to any particular request.

The actual contents of users' email accounts, including email messages, folder arrangements, and other settings, may be stored in one or more of mail database applications 610, 612, and 614 ("maildb"). These applications may operate on database server devices db0.example.com, db1.example.com, and mdbx.example.com, which are represented by database icons on the network map. Connectivity between mailbox applications 602, 604, 606, and 608 and each of mail database applications 610, 612, and 614 also is represented by respective edges.

Mailbox applications 602, 604, 606, and 608 may retrieve requested data from mail database applications 610, 612, and 614, and may also write data to mail database applications 610, 612, and 614. The data stored by mail database applications 610, 612, and 614 may be replicated across all of the database server devices.

As an example of the operation of the email service depicted by the map of FIG. 6A, an incoming email message may arrive at load balancer 600. This email message may be addressed to an email account (e.g., user@example.com) supported by the email service. Load balancer 600 may select one of mailbox applications 602, 604, 606, and 608 to store the email message. For instance, load balancer 600 may make this selection based on a round-robin procedure, the loads (e.g., CPU, memory, and/or network utilization) reported by mailbox applications 602, 604, 606, and 608, randomly, or some combination thereof.

Assuming that load balancer 600 selects mailbox application 604, load balancer 600 then transmits the email message to mailbox application 604. Mailbox application 604 may perform any necessary mail server functions to process the email message, such as verifying that the addressee is supported by the email server, validating the source of the email message, running the email message through a spam filter, and so on. After these procedures, mailbox application 604 may select one of mail database applications 610, 612, and 614 for storage of the email message. Similar to load balancer 600, mailbox application 604 may make this selection based on various criteria, including load on mail database applications 610, 612, and 614.

Assuming that mailbox application 604 selects mail database application 610, mailbox application 604 then transmits the email message to mail database application 610. Mail database application 610 may perform any necessary mail database functions to process and store the email message. For instance, mail database application 610 may store the message as a compressed file in a file system, and update one or more database tables to represent characteristics of the email message (e.g., the sender, the size of the message, its importance, where the file is stored, and so on).

When a mail client application (not shown) requests a copy of the email message, this request may also be received by load balancer 600. Load balancer 600 may select one of mailbox applications 602, 604, 606, and 608 to retrieve the email message. This selection may be made according to various criteria, such as any of those discussed above. Assuming that load balancer 600 selects mailbox application 608, mailbox application 608 then selects one of mail database applications 610, 612, and 614. Assuming that mailbox application 608 selects mail database application 612, mailbox application 608 requests the email message from mail database application 612.

Since data is replicated across mail database applications 610, 612, and 614, mail database application 612 is able to identify and retrieve the requested email message. For instance, mail database application 612 may look up the email message in a database table, from the table determine where the email message is stored in its file system, find the email message in the file system, and provide the email message to mailbox application 608. Mailbox application 608 may then transmit the email message to the mail client application.

The arrangement of FIG. 6A may vary. For example, more or fewer load balancers, mailbox applications, mail database applications, as well as their associated devices, may be present. Furthermore, additional devices may be included, such as storage devices, routers, switches, and so on. Additionally, while FIG. 6A is focused on an example email service, similar network maps may be generated and displayed for other types of services, such as web services, remote access services, automatic backup services, content delivery services, and so on.

The map displayed in FIG. 6A may be generated according to various rules. For instance, nodes representing devices of the same type or operating the same application or type of application may be placed at the same horizontal level, as in FIG. 6A. Nodes representing the entry point of the represented service may be placed at the top of the map, and the vertical arrangement of nodes may roughly correspond to the order in which the nodes become involved in carrying out operations of the service. Nonetheless, as the number of nodes and connections grows, such arrangements may vary for purposes of making presentation of the network map readable.

B. Example Service Map Grouping Based on Regular Expressions

Managed networks, such as managed network 300, may involve dozens or hundreds of computing devices, each operating one or more applications. These devices and applications may, in combination with one another, support and/or facilitate numerous services. Network maps, such as that of FIG. 6A, are helpful tools in understanding the logical and physical arrangements of devices and applications involved in service delivery. Nonetheless, the two-dimensional nature of these maps, as well as the limited screen size of computer screens, can cause network maps to become large and complicated. The sheer number of nodes and edges becomes too great to be represented on a computer screen. Even if all of such a visual representation can fit onto a screen, it may be too complex and intricate to be of practical use.

The embodiments herein introduce mechanisms through which nodes and edges of a network map can be combined in an intelligent fashion, such that nodes representing applications with a common function with respect to the higher-level service are grouped. Edges between grouped nodes may be grouped as well. Consequently, the layout and appearance of network maps may be dramatically simplified. Particularly, nodes may be grouped based on regular expressions that match the unqualified portion of their domain names.

Domain names, such as those used in DNS, may take a number of forms. A fully-qualified domain name specifies its exact location in the global DNS tree. Thus, it includes all relevant domain levels and is therefore unambiguous in this tree. All domain names appearing in FIG. 6A are fully-qualified. For instance, maillb.example.com, msrv2.example.com, and db0.example.com are all members of the top-level domain "com" and the second-level domain "example". An unqualified domain name generally does not include a dot ("."). As examples, maillb, msrv2, and db0 are unqualified domain names. Their positions within the global DNS tree are unknown without their associated top-level and second-level domains.

As a matter of common practice, many network operators provision applications and/or devices that have similar functionality with similar unqualified domain names. For instance, in FIG. 6A, mail server devices msrv1.example.com, msrv2.example.com, msrv3.example.com, and msrv4.example.com have unqualified domain names of the general form "msrv[n]", where the [n] is a digit. Database server devices db0.example.com and db1.example.com are named using a similar scheme.

TABLE 1

| Meta-Character | Meaning |
| --- | --- |
| ^ | The beginning of a string. |
| $ | The end of a string. |
| * | Zero or more of the preceding character or group of characters. |
| + | One or more of the preceding character or group of characters. |
| ? | When immediately following another qualifier, such as *, +, or even ? itself, this meta-character may be viewed as a "lazy" evaluation qualifier. It matches the shortest substring of the preceding character or group of characters such that the entire string still matches the entire regular expression, if possible. When not immediately following another qualifier, this meta-character means zero or one of the preceding character or group of characters. |
| \d | Any single character that is a digit. |
| \w | Any single character that is either alphanumeric or an underscore. |
| [ ] | Matches any single character in the brackets (e.g., [ae] matches regular character a or e, while [a-z] matches single regular characters in the lowercase alphabet). |
| ( ) | Groups together any two or more meta-characters or regular characters within the parenthesis. |

Given that related unqualified domain names often follow a pattern that can be defined syntactically, regular expressions may be used to specify these patterns. When two or more nodes in a network map have unqualified domain names that match the same regular expression, these nodes may be grouped.

Regular expressions are typically represented as character strings with each character therein either being a meta-character (having a special meaning) or a regular character (having its literal meaning). Common meta-characters are introduced in Table 1.

Given that several different sets of regular expression definitions exist (e.g., in different programming languages), embodiments may rely on any of these definitions. Nonetheless, the examples provided herein are largely compliant with the ECMASCRIPT® Language Specification standard Edition 5.1.

A regular expression may chain together a sequence of meta-characters and regular characters. For instance, consider the regular expression "^([\w-]+?)\d+[a-z]?$". This expression (which includes only the characters within the quotes) can be described as follows. The [\w-] part matches any single alphanumeric character, underscore, or dash. Thus, the [\w-]+ part matches one or more alphanumeric characters, underscores, and/or dashes. For example, the strings "ab-le_" and "z_obr-o" match this part. The [\w-]+? forces lazy (minimal) matching of the [\w-]+ part. The ([\w-]+?) part specifies that [\w-]+? part should be treated as a group.

The \d+ part matches one or more digits. The [a-z]? part matches zero or one instances of single regular characters in the lowercase alphabet. All of these expressions are within the ^ and $, thus meaning that any matched string must be matched in total – from the beginning to the end. The ? qualifier in the [\w-]+? part forces the [\w-]+ expression to match the shortest possible substring, leaving the largest possible remainder for the \d+[a-z]? part. In this way, the substring that is matched by the ([\w-]+?) part is appropriate for the grouping algorithms described below.

Accordingly, the "^([\w-]+?)\d+[a-z]?$" regular expression therefore matches a group of zero or more alphanumeric characters, underscores, and/or dashes, followed by one or more digits, followed by zero or one characters in the lowercase alphabet. Notably, this regular expression matches each of unqualified domain names msrv1, msrv2, msrv3, and msrv4, as well as db0 and db1. Unqualified domain names maillb and mdbx do not match this string. (In most cases, domain names are converted to be all lowercase prior to matching them with a regular expression.)

A goal may be to group nodes with unqualified domain names msrv1, msrv2, msrv3, and msrv4, as those domain names are associated with applications or devices that perform mail server operations. Another goal may be to separately group nodes with unqualified domain names db0 and db1, as those domain names are associated with applications or devices that perform mail database operations. Therefore, nodes may be grouped based not only on the regular expressions that they match, but also based on being associated with a common application. Accordingly, nodes msrv1, msrv2, msrv3, and msrv4 may be placed into one group, as they all match "^([\w-]+?)\d'[a-z]?$" and are associated with mailbox applications. Additionally, nodes db0 and db1 may be placed in a separate group, as they all match "^([\w-]+?)\d+[a-z]?$" and are associated with database applications.

In some embodiments, two or more regular expressions may be used, each one potentially defining one or more groups. In general, these multiple regular expressions may be arranged in a particular ordering (e.g., in a text file or in a database), and a node may be grouped based on the first regular expression it matches in this ordering. If the node also matches a regular expression appearing later in the ordering, this further match may be ignored.

For instance, suppose that it is desirable to group nodes with unqualified domain names db0, db1, and mdbx. A regular expression matching these unqualified domain names (e.g., "^[a-z0-9]*db[a-z0-9]+$") may be defined and placed above "^([\w-]+?)\d+[a-z]?$" in an ordering of regular expressions. In this way, nodes representing all of the database server devices are placed in one group, while nodes representing the mail server devices are separately grouped. Nonetheless, other possibilities exist, and any number of regular expressions may be used for purposes of grouping.

Despite the embodiments herein being focused on grouping of nodes based on commonalities in their respective domain names, groupings may be based on other names or designations of nodes. For instance, nodes in a map may be manually or automatically tagged with arbitrary strings (e.g., an application name, a service name, an owner's name, etc.), and the nodes may be grouped based on regular-expression-based matching of these strings. Any data in a CMDB that is associated with a node could potentially be used for these purposes.

Figure 6B:
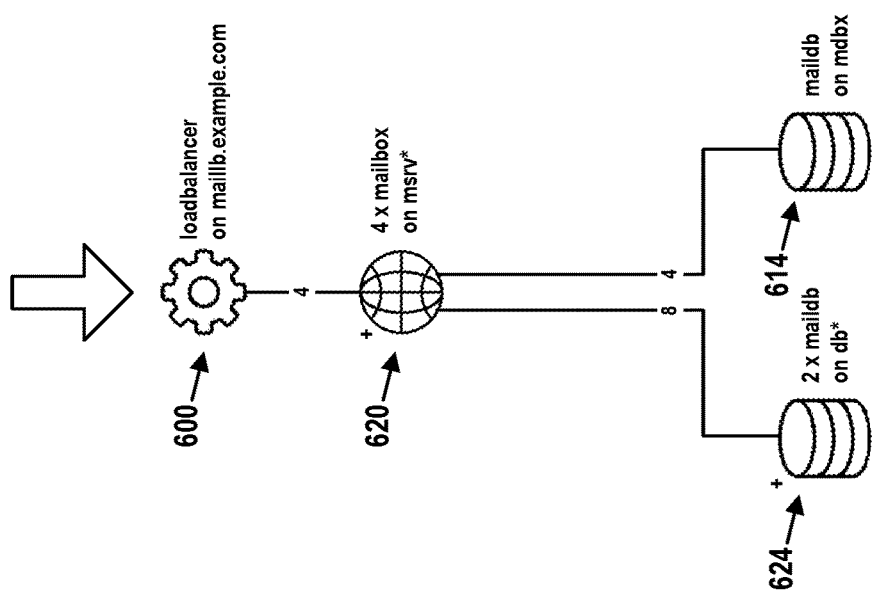
FIG. 6B depicts a network map with grouping, in accordance with example embodiments.

FIG. 6B depicts the network map of FIG. 6A with nodes grouped according to the "^([\w-]+?)\d+[a-z]?$" regular expression. Grouped node 620 represents mailbox applications 602, 604, 606, and 608 and grouped node 624 represents mail database applications 610 and 612. Particularly, grouped node 620 is labeled with the text "4× mailbox on msrv*". This indicates that grouped node 620 represents four instances of the mailbox application, and that these instances operate on computing devices having unqualified domain names that start with the common string "msrv", but differ afterward. Grouped node 624 is labeled with the text "2× maildb on db*". This indicates that grouped node 624 represents two instances of the mail database application, and that these instances operate on computing devices having unqualified domain names that start with the common string "db", but differ afterward.

FIG. 6B also depicts grouping of the edges between grouped nodes and other nodes. For example, the four edges between load balancer 600 and mailbox applications 602, 604, 606, and 608 are represented as a single edge tagged with the numeral "4". Similarly, the four edges between mailbox applications 602, 604, 606, and 608 and mail database 614 are also represented as a single edge tagged with the numeral "4". Further, the eight edges between mailbox applications 602, 604, 606, and 608 and mail database applications 610 and 612 are represented as a single edge tagged with the numeral "8". By grouping the edges as well as the nodes, the network map as displayed is even more compact, yet still represents the connectivity between the nodes.

Figure 6C:
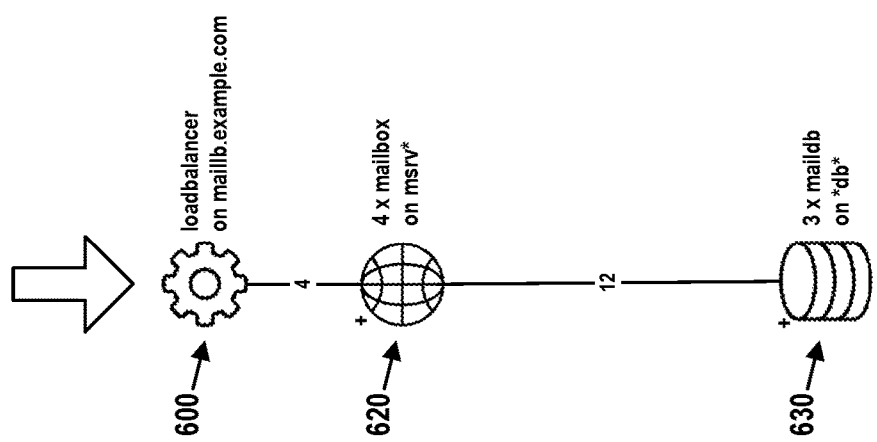
FIG. 6C depicts a network map with grouping, in accordance with example embodiments.

FIG. 6C depicts the network map of FIG. 6A with nodes grouped according to an ordering of two regular expressions. In this ordering, the regular expression "^[a-z0-9]*db [a-z0-9]+$" is above the regular expression "^([\w−]+?)\d+ [a-z]?$". As a consequence, mail database applications 610, 612, and 614 are represented by grouped node 630. This grouping results in an even more compact representation of the network map. FIG. 6C also depicts the grouping of the twelve edges between mailbox applications 602, 604, 606, and 608 and mail database applications 610, 612, and 614 as a single edge tagged with the numeral "12".

C. Expanding and Collapsing Grouped Nodes

In both FIGS. 6B and 6C, grouped nodes include a toggle labeled with a "+" in their upper left corners. This toggle may be implemented as a GUI widget that is user-selectable. When a user triggers such a toggle (e.g., clicking on it with a mouse or selecting it by way of a touchscreen), the associated grouped node may be expanded. For instance, the grouped node may be replaced with the individual nodes it represents.

Figure 6D:
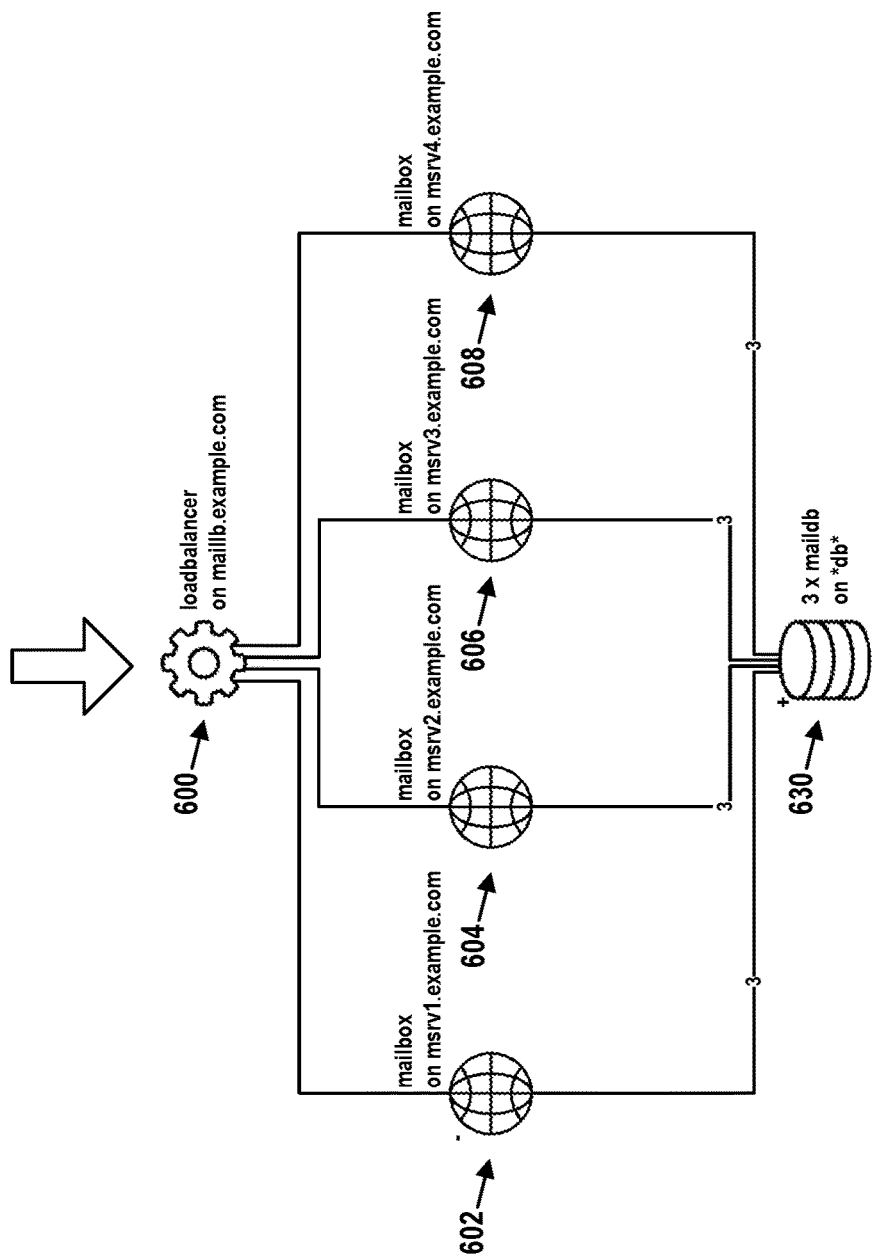
FIG. 6D depicts a network map with an expanded group, in accordance with example embodiments.

FIG. 6D depicts the network map of FIG. 6C after the toggle associated with grouped node 620 has been triggered. Accordingly, grouped node 620 is replaced with individual nodes for mailbox applications 602, 604, 606, and 608. The connectivity between these individual nodes and load balancer 600 is updated to be four separate edges. Further, the connectivity between these individual nodes and the nodes of mail database applications 610, 612, and 614 is also updated to be four separate edges. Each of these edges is tagged with the numeral "3", representing the connectivity between each of mailbox applications 602, 604, 606, and 608 and mail database applications 610, 612, and 614.

Moreover, the icon representing mailbox application 602 includes a toggle labelled with a "−" in its upper left corner. This toggle may be implemented as a GUI widget that is user-selectable. When a user triggers such a toggle (e.g., clicking on it with a mouse or selecting it by way of a touchscreen), the associated individual nodes may be re-grouped. For instance, the individual nodes may be replaced with grouped node 620, as in FIG. 6C. Users may repeatedly un-group and re-group grouped nodes by way of this mechanism.

D. Additional Embodiments

In some embodiments, grouping of nodes may only take place if there is at least a threshold number of configuration items (e.g., 10, 15, 20, 30, etc.) represented in the map. Further, the remote network management platform may support configurable options to enable or disable grouping of nodes globally, or on a per-service or per-application basis. In some cases, individual users may be able to override these preferences with their own preferences regarding such grouping.

VI. EXAMPLE OPERATIONS

Figure 7:
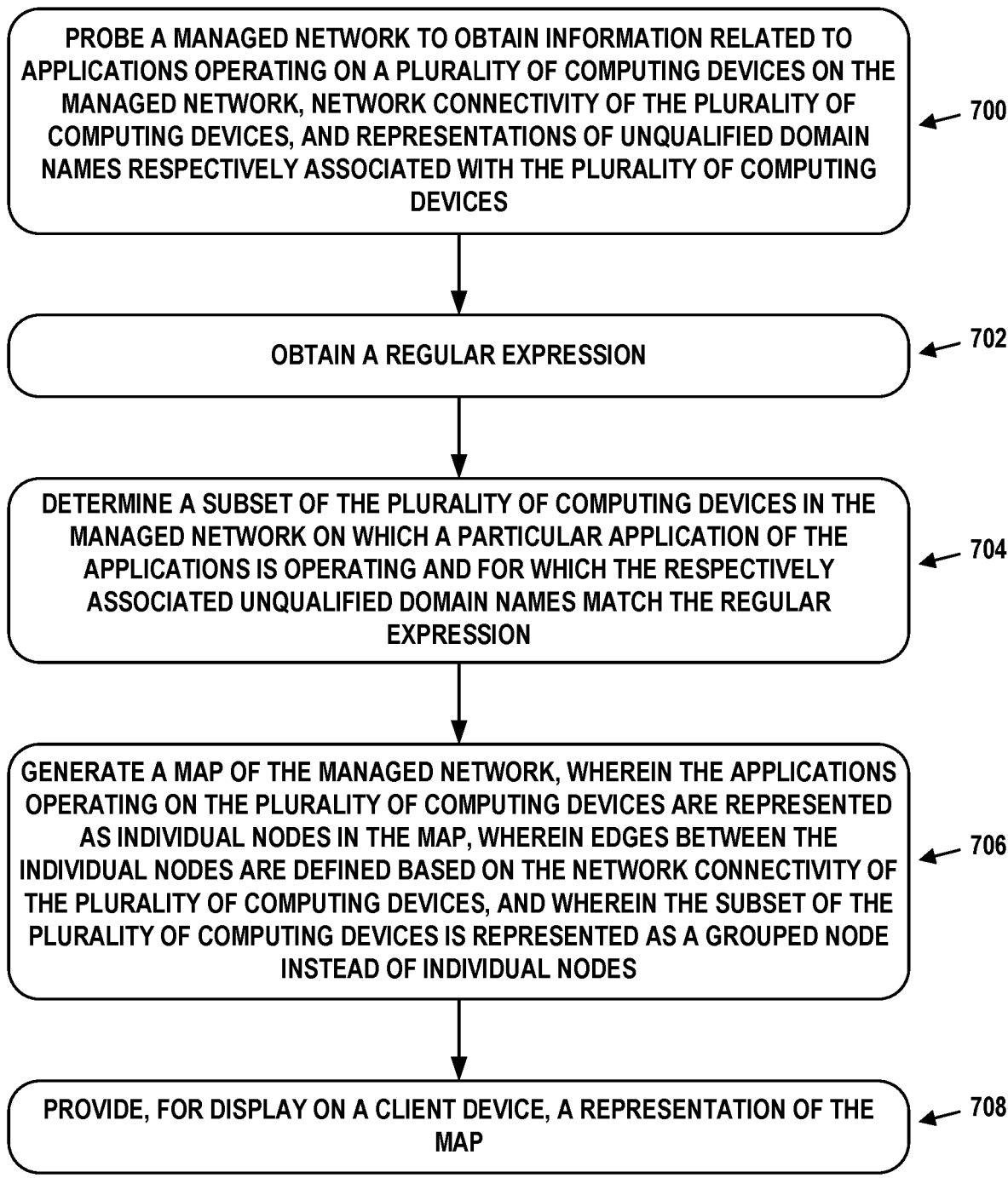
FIG. 7 is a flow chart, in accordance with example embodiments.

FIG. 7 is a flow chart illustrating an example embodiment. The process illustrated by FIG. 7 may be carried out by a one or more computing devices of a computing system, such as instances of computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein. Additionally, the context of these embodiments is not limited to aPaaS architectures, managed networks, or remote network management platforms. Thus, the embodiments herein may be used in various other environments.

A. Probing a Managed Network

Block 700 may involve probing, by a computing system, a managed network to obtain information related to applications operating on a plurality of computing devices on the managed network, network connectivity of the plurality of computing devices, and representations of unqualified domain names respectively associated with the plurality of computing devices. In some embodiments, the computing system is disposed within a remote network management platform that manages the managed network. The computing system may scan, classify, identify, and explore the managed network in accordance with the discovery procedures described above.

B. Obtaining a Regular Expression

Block 702 may involve obtaining, by the computing system, a regular expression. The regular expression may include a combination of meta-characters and regular characters, and may be obtained from a memory, a database, by way of a network, or by way of user input.

C. Determining Unqualified Domain Names that Match the Regular Expression

Block 704 may involve determining, by the computing system, a subset of the plurality of computing devices in the managed network on which a particular application of the applications is operating and for which the respectively associated unqualified domain names match the regular expression. In some embodiments, the respectively associated unqualified domain names that match the regular expression are also associated with the particular application. In other embodiments, groupings may be based on other names, tags, or designations of applications.

D. Generating a Map of the Managed Network

Block 706 may involve generating, by the computing system, a map of the managed network. The applications operating on the plurality of computing devices may be represented as individual nodes in the map, and edges between the individual nodes may be defined based on the network connectivity of the plurality of computing devices. The subset of the plurality of computing devices may be represented as a grouped node instead of individual nodes.

E. Providing a Representation of the Map

Block 708 may involve providing, by the computing system and for display on a client device, a representation of the map. Reception of the map by the client device may cause the client device to display the map. Some embodiments may further involve receiving, from the client device, an indication that a toggle associated with the grouped node has been activated, and providing, for display on the client device, a second representation of the map in which the grouped node is replaced by a plurality of individual nodes respectively representing the subset of the plurality of computing devices.

Alternative or additional embodiments may involve generating a string representing a common portion of the respectively associated unqualified domain names that match the regular expression. The map as displayed may include, for the grouped node, an indication of the particular application, an indication of a number of computing devices represented by the grouped node, and an indication of the string.

The string may include the common portion and a wildcard character, the wildcard character representing parts of the respectively associated unqualified domain names that are not common. The grouped node may represent a plurality of individual nodes, where the computing devices represented by individual nodes are each connected, in the managed network, to a computing device represented by a further node, and where the map as displayed includes a single connection between the grouped node and the further node. In some embodiments, there are n nodes in the plurality of individual nodes, and the map as displayed labels the single connection with a representation of n.

Alternative or additional embodiments may involve obtaining a second regular expression, where the second regular expression appears after the regular expression in an ordering of regular expressions. These embodiments may also involve determining a second subset of the plurality of computing devices in the managed network on which a second particular application of the applications is operating and for which the respectively associated unqualified domain names match the second regular expression but do not match the regular expression. The second subset of the plurality of computing devices may be represented as a second grouped node instead of individual nodes. This second grouped node may also be toggled to reveal its individual nodes.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a managed network containing a plurality of computing devices, wherein the plurality of computing devices are respectively associated with unqualified domain names;
a proxy server application disposed within the managed network; and
one or more server devices disposed within a remote network management platform that manages the managed network, wherein the one or more server devices are configured to:
probe the managed network by way of the proxy server application to obtain information related to applications operating on the plurality of computing devices, network connectivity of the plurality of computing devices, and representations of the unqualified domain names;
obtain two or more regular expressions, wherein each regular expression of the two or more regular expressions comprises a respective character string of one or more meta-characters that indicate a respective characteristic of a matching unqualified domain name and one or more regular characters that are present within the matching unqualified domain name;
determine an order in which to apply the two or more regular expressions to the unqualified domain names based on a respective type of each application operating on the plurality of computing devices;
apply the two or more regular expressions to the unqualified domain names based on the order, wherein applying each regular expression of the two or more regular expressions comprise determining a respective subset of the plurality of computing devices in the managed network on which a particular application of the applications is operating and for which the respectively associated unqualified domain names match the regular expression;
generate a map of the managed network, wherein the applications operating on the plurality of computing devices are represented as individual nodes in the map, wherein edges between the individual nodes are defined based on the network connectivity of the plurality of computing devices, and wherein each respective subset of the plurality of computing devices is represented as a respective grouped node instead of as individual nodes; and
provide, for display on a client device, a representation of the map.

2. The system of claim 1, wherein the respectively associated unqualified domain names that match the regular expression are also associated with the particular application.

3. The system of claim 1, wherein reception of the map by the client device causes the client device to display the map.

4. The system of claim 1, wherein the one or more server devices are configured to:
receive, from the client device, an indication that a toggle associated with a grouped node has been activated; and
provide, for display on the client device, a second representation of the map in which the grouped node is replaced by a plurality of individual nodes respectively representing the subset of the plurality of computing devices.

5. The system of claim 1, wherein the one or more server devices are configured to:
generate a string representing a common portion of the respectively associated unqualified domain names that match the regular expression, wherein the map as displayed includes, for the grouped node, an indication of the particular application, an indication of a number of computing devices represented by a grouped node, and an indication of the string.

6. The system of claim 5, wherein the string includes the common portion and a wildcard character, the wildcard character representing parts of the respectively associated unqualified domain names that are not common.

7. The system of claim 5, wherein the grouped node represents a plurality of individual nodes, wherein the computing devices represented by the plurality of individual nodes are each connected, in the managed network, to a computing device represented by a further node, and wherein the map as displayed includes a single connection between the grouped node and the further node.

8. The system of claim 7, wherein there are n nodes in the plurality of individual nodes, and wherein the map as displayed labels the single connection with a representation of n.

9. A method comprising:
probing, by a computing system, a managed network to obtain information related to applications operating on a plurality of computing devices on the managed network, network connectivity of the plurality of computing devices, and representations of unqualified domain names respectively associated with the plurality of computing devices;
obtaining, by the computing system, two or more regular expressions, wherein each regular expression of the two or more regular expressions comprises a respective character string of one or more meta-characters that indicate a respective characteristic of a matching unqualified domain name and one or more regular characters that are present within the matching unqualified domain name;
determining, by the computing system, an order in which to apply the two or more regular expressions to the unqualified domain names based on a respective type of each application operating on the plurality of computing devices;
applying, by the computing system, the two or more regular expressions to the unqualified domain names based on the order, wherein applying each regular expression of the two or more regular expression comprise determining a respective subset of the plurality of computing devices in the managed network on which a particular application of the applications is operating and for which the respectively associated unqualified domain names match the regular expression;
generating, by the computing system, a map of the managed network, wherein the applications operating on the plurality of computing devices are represented as individual nodes in the map, wherein edges between the individual nodes are defined based on the network connectivity of the plurality of computing devices, and wherein each respective subset of the plurality of computing devices is represented as a respective grouped node instead of as individual nodes; and
providing, by the computing system and for display on a client device, a representation of the map.

10. The method of claim 9, wherein the computing system is disposed within a remote network management platform that manages the managed network.

11. The method of claim 9, wherein the respectively associated unqualified domain names that match the regular expression are also associated with the particular application.

12. The method of claim 9, wherein reception of the map by the client device causes the client device to display the map.

13. The method of claim 9, comprising:
receiving, from the client device, an indication that a toggle associated with a grouped node has been activated; and
providing, for display on the client device, a second representation of the map in which the grouped node is replaced by a plurality of individual nodes respectively representing the subset of the plurality of computing devices.

14. The method of claim 9, comprising:
generating a string representing a common portion of the respectively associated unqualified domain names that match the regular expression, wherein the map as displayed includes, for the grouped node, an indication of the particular application, an indication of a number of computing devices represented by a grouped node, and an indication of the string.

15. The method of claim 14, wherein the string includes the common portion and a wildcard character, the wildcard character representing parts of the respectively associated unqualified domain names that are not common.

16. The method of claim 14, wherein the grouped node represents a plurality of individual nodes, wherein the computing devices represented by the plurality of individual nodes are each connected, in the managed network, to a computing device represented by a further node, and wherein the map as displayed includes a single connection between the grouped node and the further node.

17. The method of claim 16, wherein there are n nodes in the plurality of individual nodes, and wherein the map as displayed labels the single connection with a representation of n.

18. An article of manufacture including a non-transitory computer-readable medium, having stored thereon program instructions that, upon execution by a computing system, cause the computing system to perform operations comprising:
probing a managed network to obtain information related to applications operating on a plurality of computing devices on the managed network, network connectivity of the plurality of computing devices, and representations of unqualified domain names respectively associated with the plurality of computing devices;
obtaining two or more regular expressions, wherein each regular expression of the two or more regular expressions comprises a respective character string of one or more meta-characters that indicate a respective characteristic of a matching unqualified domain name and one or more regular characters that are present within the matching unqualified domain name;
determining, by the computing system, an order in which to apply the two or more regular expressions to the unqualified domain names based on a respective type of each application operating on the plurality of computing devices;
applying, by the computing system, the two or more regular expressions to the unqualified domain names based on the order, wherein applying each regular expression of the two or more regular expression comprise determining a respective subset of the plurality of computing devices in the managed network on which a particular application of the applications is operating and for which the respectively associated unqualified domain names match the regular expression;
generating a map of the managed network, wherein the applications operating on the plurality of computing devices are represented as individual nodes in the map, wherein edges between the individual nodes are defined based on the network connectivity of the plurality of computing devices, and wherein each respective subset of the plurality of computing devices is represented as a respective grouped node instead of as individual nodes; and
providing, for display on a client device, a representation of the map.

* * * * *